United States Patent
Cross

(10) Patent No.: US 8,366,937 B2
(45) Date of Patent: Feb. 5, 2013

(54) IMMOBILIZATION OF NANO- AND MICRO-SIZED PARTICLES FOR USE IN CHEMICAL CATALYSIS

(76) Inventor: Kenneth W. Cross, Cardiff, CA (US)

( * ) Notice: Subject to any disclaimer, the term of this patent is extended or adjusted under 35 U.S.C. 154(b) by 1351 days.

(21) Appl. No.: 12/019,611

(22) Filed: Jan. 24, 2008

(65) Prior Publication Data

US 2012/0132592 A1    May 31, 2012

Related U.S. Application Data

(63) Continuation of application No. 11/210,449, filed on Aug. 25, 2005, now Pat. No. 7,371,327.

(60) Provisional application No. 60/658,383, filed on Mar. 4, 2005.

(51) Int. Cl.
*B01D 35/06* (2006.01)
*B03C 1/02* (2006.01)

(52) U.S. Cl. ........ 210/695; 210/222; 210/223; 977/902; 422/186.01; 204/155; 204/557; 204/664

(58) Field of Classification Search .................. 210/222, 210/223, 695; 977/902; 422/186.01; 204/155, 204/557, 664
See application file for complete search history.

(56) References Cited

U.S. PATENT DOCUMENTS

| | | | |
|---|---|---|---|
| 3,627,678 A | 12/1971 | Marston et al. | |
| 3,676,337 A | 7/1972 | Kolm | |
| 4,201,827 A | 5/1980 | Heitkamp | |
| 4,309,290 A | 1/1982 | Heitkamp | |
| 4,314,905 A | 2/1982 | Etzel et al. | |
| 4,668,383 A * | 5/1987 | Watson | 210/222 |
| 5,254,231 A | 10/1993 | Heath et al. | |
| 5,547,585 A | 8/1996 | Shepherd et al. | |
| 6,150,181 A | 11/2000 | Halbreich et al. | |
| 6,248,235 B1 | 6/2001 | Scott | |
| 6,274,049 B1 | 8/2001 | Scott | |
| 6,330,947 B1 | 12/2001 | Scott | |
| 6,508,367 B2 | 1/2003 | Scott | |
| 6,524,457 B1 | 2/2003 | Scott | |
| 6,632,897 B1 | 10/2003 | Geiter et al. | |
| 6,830,694 B2 | 12/2004 | Schiestel et al. | |

* cited by examiner

*Primary Examiner* — David A Reifsnyder
(74) *Attorney, Agent, or Firm* — Paradigm IP Law, PC; Ross L. Franks

(57) ABSTRACT

What is presented is an innovative design of a chemical reactor for catalytic breakdown of halogenated hydrocarbons, the body of which acts as a specialized electromagnet capable of immobilizing and retaining very large quantities of non-magnetized ferro-dia- or para-magnetic material-containing nano, micro-, or milli-particles within it's reactor volume despite high-velocity flow of any liquid through said reactor. This is accomplished without any pre-treatment to the nanoparticles, without the use of adhesive of any sort, electroplating, electrolytic action, nano-structured nanocages, membrane or other impregnation, or any other mechanical or chemical means.

27 Claims, 2 Drawing Sheets

IMMOBILIZATION OF NANO- AND MICRO-SIZED PARTICLES FOR USE IN CHEMICAL CATALYSIS

CROSS-REFERENCE TO RELATED APPLICATIONS

This application is a continuation of and hereby incorporates by reference herein U.S. patent application Ser. No. 11/210,449, filed Aug. 25, 2005, which issued as U.S. Pat. No. 7,371,327 on May 13, 2008, and which claimed priority to U.S. Provisional Application No. 60/658,383, which was filed Mar. 4, 2005.

BACKGROUND OF THE INVENTION

1. Field of the Invention

The present invention relates generally to chemical reactors and more particularly to devices for immobilizing particles in a reactant fluid flow.

2. Description of Related Art

Metallic nanoparticles (MNPs), which have at least one compositional constituent which is ferromagnetic, diamagnetic, or paramagnetic, have several extremely interesting and useful properties: their size, their structure, and in the case of bi- or multi-metallic nanoparticles, their junction voltage(s). Because they range from approximately 10 nanometers to 3 millimeters in characteristic dimension, usually mean effective diameter, regardless of their exact nanostructure or shape, the resulting ratio of the surface area to the mass of these particles is very high: one kilogram of 10 mm diameter catalytic particles has a surface area of approximately 600 cm2, while the same mass of 10-nm diameter nanoparticles will have a surface area of approximately 600 million cm2, a six-order of magnitude ratio. In catalysis, the reactants must each physically contact the surface of the catalyst in order to react, and the actual catalysis takes place on the surface of the catalytic species. Hence, this million-fold increase in surface area means that the potential rate of chemical reaction is one million times as great. Moreover, in the case of bi- or even multi-metallic MNPs, the rate of conversion attainable is also a function of the amount of bimetallic interface exposed to the reactant stream, and nanocatalysts have been developed which maximize this interfacial area on each nanoparticle, compounding the already huge catalytic advantage of nanocatalysis.

Now, by definition, a catalyst is different than a reactant. A catalyst facilitates a reaction but is neither created nor consumed by it. When one mole of reactant has reacted, the catalyst remains in it's original form, ready to facilitate another reaction, and so on ad infinitum.

Hence, besides size and structure, and often junction voltage, there is one further attribute which a good catalyst must have: It must stay in place in the reactor as the reactants move through and over its particles' surfaces, and not leave the discharge end reactor with the products. Now most often, standard catalyst particles are from 0.5 cm up to 5 cm in diameter, and are immobilized using one of two techniques: (1) the particles are attached—epoxied, glued, embedded, tack welded, or otherwise—to the surface of a stationary 'plate' of some sort, creating a 'fixed bed' over which the reactants then flow; or (2) the loose particles are simply packed between two screens in the reactor column and held in place by the screens themselves, creating a 'packed bed', over which the reactants then flow. In this latter configuration, it is the screens themselves which hold the particles from being entrained in the fluid flow, and hence the screens must be (a) strong, (b) resistant to corrosion/erosion by the reactants, products and conditions in the reactor, (c) must have a high percentage of open area to minimize the degree to which they impede flow through the reactor, and (d) must have openings which are significantly smaller than the catalytic particles themselves. Unfortunately, the minuscule size of nanoparticles, though having the advantages discussed above, also comes with an inherent disadvantage: it renders both of these immobilization technique types useless: Technique type (1) cannot fit enough nanoparticles in a small enough space to take advantage of the nanocatalysts' high surface area and always covers up a significant portion of the nanocatalyst particles' surfaces technique, further reducing its efficacy, while type (2) is impractical for any particles below about 1 mm, let alone nano-sized particles, especially considering requirements a, b, c, & d above.

BRIEF SUMMARY OF THE INVENTION

Certain embodiments of the present invention comprise systems and methods for High-Efficiency Nano-Catalyst Immobilization (HENCI) reactors which constitute a new, novel, and completely unique way to immobilize or fix-in-place small chemical catalyst particles, including but not limited to MNPs, and comprises an apparatus and method for the immobilization or fixation of MNPs by building and configuring a chemical reactor to also be an electromagnet or a system permanent magnets, wherein the portion of the magnetic circuit which is open for work (the only portion of the magnetic circuit which is not occupied by/made of a solid mass, the portion of the circuit where the magnetic field is highly concentrated to serve the function of the device as in the open part of, say, a lifting electromagnet) is (1) also the chemical reaction zone within the magnet/reactor body, and (2) is packed with a high-surface-area, high-magnetic-permeability, woolen-structured matrix with a low specific flow-resistance (DelP/GPM/Axs/Unit reactor length) (hereafter HPMM).

This HPMM then, is located directly in the flow path and reaction zone of the reactor and constitutes an high magnetic-field-density portion or 'leg' of the magnetic circuit (where the lines of magnetic flux are close together). The HPMM, with its aforementioned woolen structure, is comprised up of many long intertwined fibers or strands as in the shape of steel wool, compressed together and thus in intermittent and intimate contact with each other.

Amorphous on a macro-scale, this woolen HPMM is comprised of individual strands acting individually on a micro scale, and the magnetic lines of flux are directed preferentially through the tortuous paths of the HPMM due to it's magnetic permeability being much greater than that of the process fluid. The magnetic flux lines, however, are not constrained to follow just one strand: when a strand's path brings it to one of the (many) points where it contacts another strand, the flux line will continue along whichever strand happens to be best aligned (axially) with the direction of the magnetic field at that point.

Now, imagine a section, dL, of one strand, which is short enough to be considered straight. In each of these sections, the strength of the magnetic field surrounding the strand decreases radially in the plane orthogonal to the axis of the strand section. Since the strength of this magnetic field decreases fastest right at the surface of each strand, the magnetic field gradient is greatest at the surface of each strand. For each section dL, then, there exists a cylindrical volume of very high magnetic field gradient of radius dR and length dL. Hence, integrated over the entire length of each strand and multiplied by the number of strands in one charge of the HPMM, the amount of volume in the reactor which now has a very high magnetic field gradient is (1) greatly multiplied and (2) dispersed evenly throughout the work area of the magnetic circuit/reaction zone of the reactor, such that the number of nanoparticles which can be held in place (immobilized) per unit reactor volume is high enough to take advantage of their ultra-high catalytic ability per unit nano-mass. This is what renders HENCI unique, novel, and high-efficiency.

This invention is notable for not using zeolites, nanocages, binders, or adhesives to hold the catalyst particles onto the support matrix, relying instead on the unique configuration—an even dispersion of many high-gradient micro-volumes, collectively called a field tensor—of the magnetic field created by the combination of the HENCI magnet-reactor design and 'magnetic-core morphology' of the HPMM to hold a very high number of magnetic nanoparticles to the HPMM, and thus within the reactor body, at packing densities at least several orders of magnitude higher than any other technology, while exposing the entire, or nearly the entire surface area of each MNP to the reactant flow.

Accordingly, it is the principal object and advantage of this invention to immobilize ferro-, dia-, and paramagnetic particles and nanoparticles within a catalytic reactor without the use of adhesives, electroplating, electrodeposition, impregnation, nanocages, or zeolytes.

It is a further object of this invention to immobilize Mnps in the reactor (prevents them from being entrained in the flow of the reactant) without covering up any of their surface area, which would defeat the purpose of using them in the first place.

It is a further object of this invention that the magnetic field be created and sustained by either permanent magnets or electromagnet.

Hence the scope of this invention encompasses two fundamental reactor design types: that utilize a permanent magnetic field (hereafter 'PM Reactor'), and that utilizing an electromagnetic field (hereafter "EM Reactor').

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Figure 1:
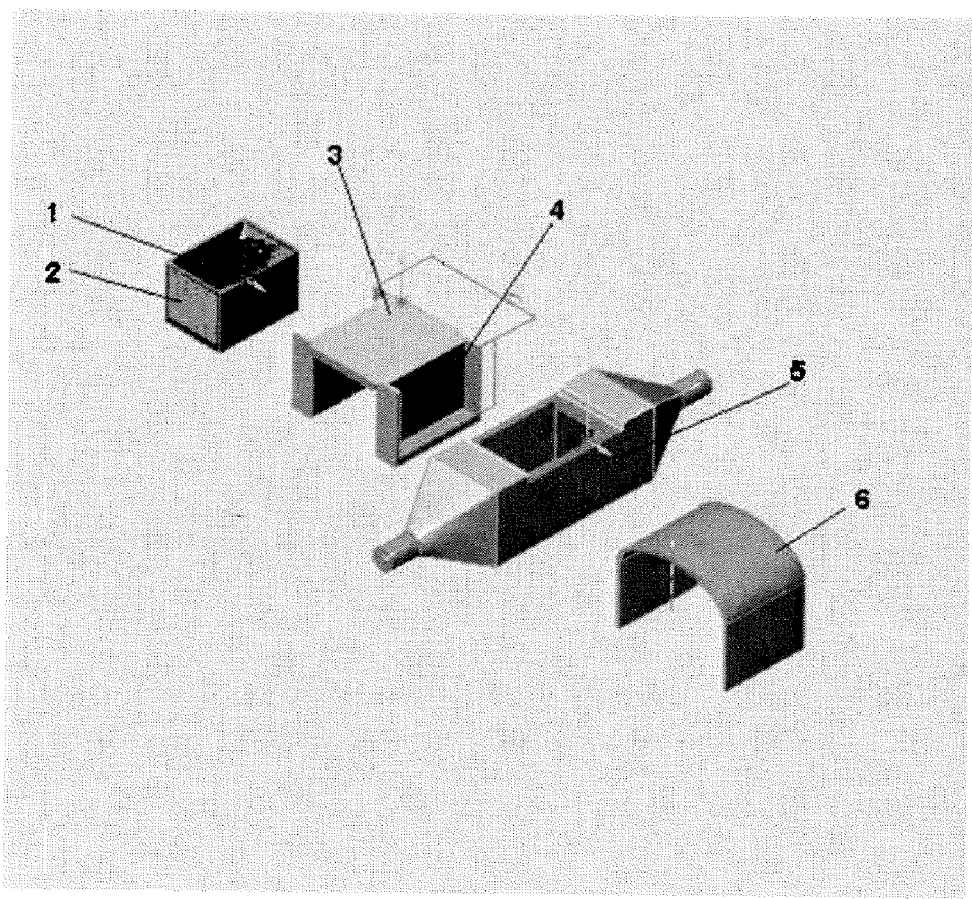
FIG. 1 is an exploded view of the PM reactor.

An example of a PM reactor is depicted in FIG. 1. The high-permeability matrix (1) is loaded into the reactor basket (2), which is sealed into the reactor body using sealing lid (3). Two face-pole magnets (4) are then placed abreast of the main section of the reactor body (5) with their 'North' poles facing in the same direction. Note that, in this design, the lines of magnetic flux between the two inner facing poles of the magnet will be parallel and of nearly constant density within the boundary of the magnet faces. Note also that the area of each magnet pole-face (normal to the lines of flux) is approximately equal to the side face of the reactor basket. To increase the strength of the magnetic field between the two magnets, a metallic or otherwise high-magnetic permeability magnetic 'bridge' (6) can be lowered onto and over the outside of both magnets, creating, in effect, one 'U' shaped magnet with the 'open' section between the face-poles of the magnets. Hence all the flux lines will be subject to the aforementioned action of the HPMM woolen matrix: they will preferentially follow the highly-tortuous paths of the matrix' wool itself, thus creating the very large areas of high magnetic-flux gradient responsible for the ultra-high density of MNPs which are immobilized within the reactor volume.

Note that this design allows the basket, HPMM, and attached MNPs to be removed for service or inspection without releasing the MNPs into the discharge stream. Note also that, should the reactor be designed for swing-batch operation, the ability to remove just the magnets (with the bridge in one unit) allows one to release the MNPs from the matrix at will, should a new charge of MNPs be required.

Figure 2:
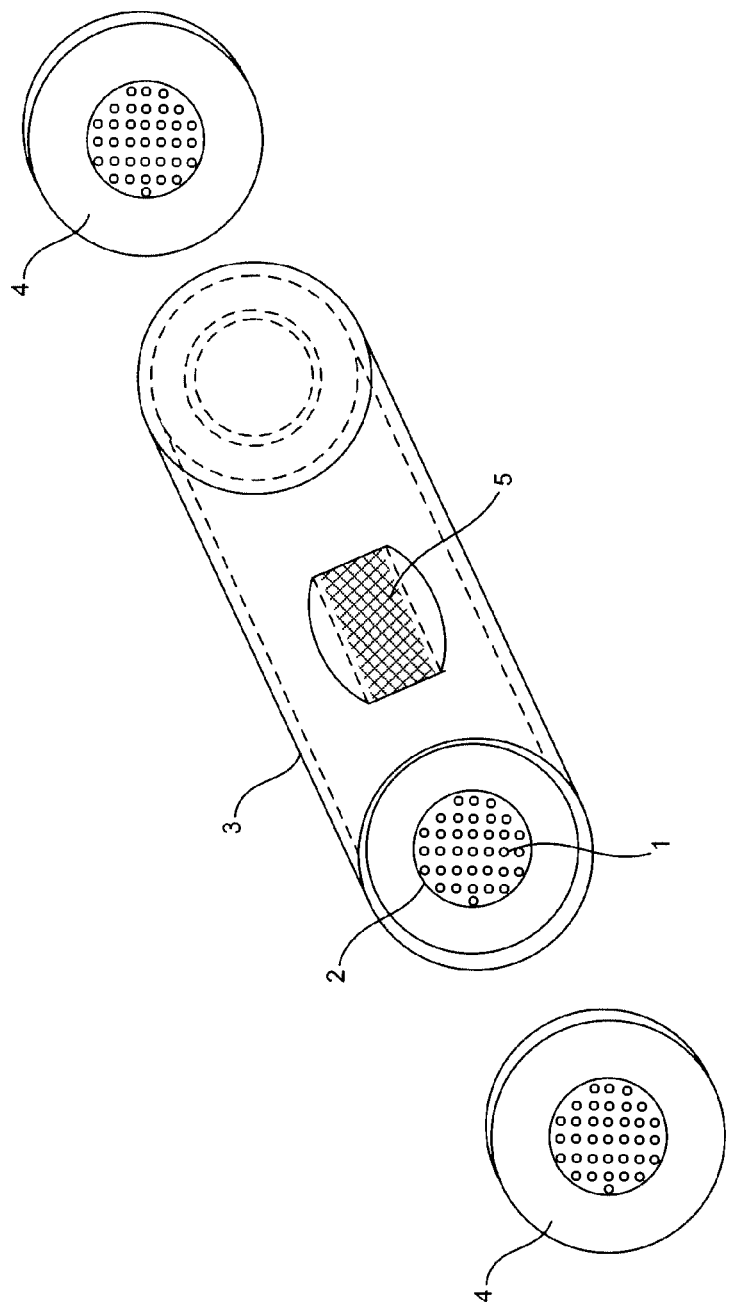
FIG. 2 is an exploded view of the EM reactor.

The design of the EM reactor is depicted in FIG. 2. This is a tubular reactor which can be positioned in any orientation, though chemical processing considerations may often render it optimal to employ the reactor such that it's axis lies in a vertical or horizontal plane. Referring to FIG. 2 then, the reactors tubular wall (1) is made of a non-conducting (low-permeability) material. Its outer surface is used as a mandrel for the necessary wire windings (2) which, when energized by a power source which outputs either DC current or a hybrid AC/DC current whose amplitude never falls to or below zero, create an elongated toroidal-shaped magnetic field whose axis is co-linear with the main reactor body. The windings are then covered or 'sheathed' by a ferromagnetic 'sheath' tube (3) which serves to efficiently conduct the magnetic lines of flux through the outer portion of the aforementioned toroidal field. The 'endcaps' of the EM-reactor (4) contain one or more Ferro, dia, or para-magnetic materials which serve to efficiently conduct the magnetic lines of flux radially through the end-portions of the aforementioned toroidal field. The endcaps or 'end-plates' are machined to have a 'screen' or 'grid' in their center, of diameter similar to the inside diameter of the reactor tube/wall (3), such that they can still conduct the lines of flux to and from the core matrix material while also allowing the reactant fluid to flow into, and the reaction products to flow out of, the EM reactor body. In this way, the efficiency (overall or "loop" permittivity) of the magnet is maximized, the HPMM is held in place by the grid or continuous metal paths machined into of the screen/grid of each 'endcap', and the process fluid is simultaneously allowed to flow through the reactor body. The endcaps or 'endplates' can also act as flange gaskets to facilitate connection of the reactor to the process piping or tubing, while allowing fluid flow through their openings, perforations, or screen, which is in intimate contact with both the HPMM and the high-permeability outer sheath of the magnet-reactor. Note that simply de-energizing the electromagnet without halting the fluid flow through the reactor allows one to release the MNPs from the HPMM at will, should a new charge of MNP's, or new HPMM be required for any reason (due to failure of upstream systems, etc.). This option could, of course be facilitated using a dual-EM-reactor (parallel operation swing-batch) design, in which, by the use of isolation valves, one of the EM reactors could be brought 'off-line' and put into a 'flush circuit'. This is standard Chemical Process Industry practice for continuous reactors and allows service or repair of one unit while the second unit takes over without interrupting the overall operation.

Additionally, note that the entire HPMM/MNP combination can be cathodically protected, by connecting a cathodic lead to the outer sheath of the HENCI EM reactor or the magnetic bridge of the PM reactor min a manner similar to that used for underground piping, etc., to increase the longevity of the least-noble metal in the nanocatalyst particles AND in the HPMM, having the non-obvious advantage of further preserving the catalyst itself from galvanic or other corrosive attack.

There are several additional unique aspects to this invention:

No binder, coating, adhesive, any or other materials are required to immobilize the MNPs.

2. The immobilized MNPs can be as small as can be manufactured (currently down to about 20 nm effective diameter but there is no lower limit on the size of particles supported by HENCI) and up to 5 mm in effective diameter 3. MNPs are held in place solely by high gradients in a magnetic field the vector quantity of which may change value with time, but does not change direction.

4. Magnetic field strength gradients are created by a) concentrating the flux lines in the reaction zone, and b) exploiting the difference in magnetic permeability of the HPMM versus that of the reactant stream.

5. The highly dispersed morphology of the magnetic field gradient, being split up into a very large number of contiguous micro-gradient areas is also responsible HENCI reactors' capacity to immobilize ultra-high numbers of MNPs within a small space without causing excessive pressure drop during continuous-flow operation.

6. MNPs are not magnetized prior to use.

7. MNPs need not be magnetized during use: the magnetic field is either designed to be (PM reactor) or adjusted to be (EM reactor) just strong enough to hold the MNPs in place during flow through operation, such that they are magnetized as little as physically possible during use, and can thus be released at will form the HPMM by removing (PM)/de-energizing (EM) the magnetic field, and otherwise handled as described in the detailed descriptions of the reactors above.

8. If process considerations (e.g. long runs, high flows, etc) dictate that the magnetic field strength and time of exposure render the MNPs slightly magnetized after use, and a less-than-satisfactory percentage of catalytic particles emerge from the HENCI reactor after removal/de-energizing of the Magnetic field, the entire slug of (low-cost) HPMM is simply replaced, some new MNPs are added to make up for those which adhered to the old HPMM, and the reactor is recharged 9. Although normal steel wools, stainless steel wools, special alloy stainless steel wools, including low Ni stainless steel, as well as other rare-earth elements and alloys, can be used as the HPMM material, any material with a magnetic-permeability significantly higher than the carrier fluid can theoretically be employed successfully for the woolen matrix.

10. The woolen matrix becomes part of the magnetic field circuit.

11. In the EM, wool comprises the 'core' which runs through the electromagnet axis, and in the PM, the wool lies directly between two poles the line between whose centers intersects (or nearly intersects) and is perpendicular to the axis of flow 12. In the EM Design, the inlet and outlet 'planes' of the reactor facilitate the high-permittivity conduction of magnetic field lines by virtue of the fact that they include a continuous metallic 'circuit' or path across the plane of the reactor face, accomplished by machining a grid into the 'end-caps' of the electromagnet. This allows fluid flow through the reactor while also affording a high-permeability path for the magnetic flux to travel from the iron (outer) sheath radially inward (and outward on the other end of the reactor) to/from/ and through the specialized 'core' of the reactor, which contains the high surface area matrix onto which the particles are immobilized, without a non-metallic gap in the magnetic circuit.

13. Operationally, the HPMM is pre-loaded into the reactor (open) core/reaction zone, the reactor flanges are then replaced, the reactor is then connected to an inlet and outlet conduit. For enabling the system, the inlet and outlet are connected to a reservoir, which has a pump connected to the reactor inlet tube. The pump is energized and the carrier fluid is then cycled through the reactor in a closed loop. The MNPs are then added to the reservoir and become homogeneously dispersed in the fluid. Within minutes, the fluid has carried all the MNPs into the HENCI reactor, where they have been immobilized in the HPMM, as evidenced by the clarity of the carrier fluid exiting the reactor. At this point, the inlet tube is connected to the reactant source, and the catalysis and reaction take place continuously producing a discharge stream rich in reaction product.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A method for chemical catalytic reaction comprising:
   providing for fluids to flow through a reactor body, wherein the reactor body includes a high permeability metallic matrix (HPMM) mounted within it such that the HPMM can be contacted by the fluids, the HPMM being magnetically permeable to magnetic flux and physically permeable to the fluids;
   providing a magnetic field for magnetically permeating the HPMM;
   causing a carrier fluid to flow through the HPMM, the carrier fluid purposely including catalytic particles;
   initializing the magnetic field to magnetically couple at least some of the catalytic particles to the HPMM;
   causing at least one reactant fluid to flow through the HPMM during a continuing presence of the magnetic field, wherein the magnetically coupled catalytic particles facilitate the chemical catalytic reaction using the at least one reactant fluid.

2. The method of claim 1, wherein providing for the fluids to flow through the reactor body includes configuring one or more valves to inlet and outlet conduits associated with the reactor body for selectively allowing the fluids to flow through the reactor.

3. The method of claim 2, wherein configuring the one or more valves includes separately causing the carrier fluid and the at least one reactant fluid to flow through the reactor.

4. The method of claim 1, and further including:
removing the magnetic field to de-couple at least some of the magnetically coupled catalytic particles from the HPMM; and
causing a flushing fluid to flow through the HPMM for clearing the de-coupled catalytic particles out of the reactor body.

5. The method of claim 4, wherein:
initializing the magnetic field includes moving at least one permanent magnet and the reactor body closer to each other; and
removing the magnetic field includes moving the at least one permanent magnet and the reactor body away from each other.

6. The method of claim 4, wherein:
initializing the magnetic field includes energizing an electromagnet that is configured with at least a portion of the reactor body; and
removing the magnetic field includes de-energizing the electromagnet.

7. The method of claim 1, wherein causing the carrier fluid to flow through the HPMM includes allowing the catalytic particles to become approximately homogeneously distributed throughout the HPMM before initializing the magnetic field.

8. The method of claim 1, wherein the catalytic particles include ferromagnetic, diamagnetic or paramagnetic catalytic particles.

9. The method of claim 1, wherein the catalytic particles are sized between approximately 10 nanometers and approximately 3 millimeters.

10. A chemical catalytic reactor system comprising:
a reactor body configured to selectively allow fluids to flow through it;
a high permeability metallic matrix (HPMM) mounted within the reactor body and adapted to be contacted by the fluids, the HPMM being magnetically permeable to magnetic flux and physically permeable to the fluids;
a magnet operable with the catalytic reactor to provide a magnetic field for magnetically permeating the HPMM during:
a first flow of a carrier fluid through the HPMM, wherein the carrier fluid purposely includes catalytic particles that become magnetically coupled to the HPMM after initialization of the magnetic field; and
a subsequent flow of at least one reactant fluid through the HPMM during a continuing presence of the magnetic field, wherein the magnetically coupled catalytic particles facilitate a chemical catalytic reaction using the at least one reactant fluid.

11. The system of claim 10, further including one or more valves configured to inlet and outlet conduits associated with the reactor body and used to selectively allow the fluids to flow through the reactor body.

12. The system of claim 11, wherein the one or more valves are used to separately provide the first flow and the subsequent flow through the reactor body.

13. The system of claim 10, wherein the magnet is also operable with the catalytic reactor to remove the magnetic field during a third flow of a flushing fluid for de-coupling at least some of the magnetically coupled catalytic particles from the HPMM and for clearing the de-coupled catalytic particles out of the reactor body.

14. The system of claim 13, wherein:
the magnet is at least one permanent magnet;
the magnetic field is initialized by moving the at least one permanent magnet and the reactor body closer to each other; and
the magnetic field is removed by moving the at least one permanent magnet and the reactor body away from each other.

15. The system of claim 13, wherein:
the magnet is an electromagnet configured with at least a portion of the reactor body;
the magnetic field is initialized by energizing the electromagnet; and
the magnetic field is removed by de-energizing the electromagnet.

16. The system of claim 10, wherein the magnetic field is initialized after the catalytic particles within the carrier fluid are allowed to become approximately homogeneously distributed throughout the HPMM.

17. The system of claim 10, wherein the catalytic particles include ferromagnetic, diamagnetic or paramagnetic catalytic particles.

18. The system of claim 10, wherein the catalytic particles are sized between approximately 10 nanometers and approximately 3 millimeters.

19. An apparatus for chemical catalytic reaction comprising:
means for providing for fluids to flow through a reactor body, wherein the reactor body includes a high permeability metallic matrix (HPMM) mounted within it such that the HPMM can be contacted by the fluids, the HPMM being magnetically permeable to magnetic flux and physically permeable to the fluids;
means for providing a magnetic field for magnetically permeating the HPMM;
means for causing a carrier fluid to flow through the HPMM, the carrier fluid purposely including catalytic particles;
means for initializing the magnetic field to magnetically couple at least some of the catalytic particles to the HPMM;
means for causing at least one reactant fluid to flow through the HPMM during a continuing presence of the magnetic field, wherein the magnetically coupled catalytic particles facilitate the chemical catalytic reaction using the at least one reactant fluid.

20. The apparatus of claim 19, wherein the means for providing for the fluids to flow through the reactor body includes means for configuring one or more valves to inlet and outlet conduits associated with the reactor body for selectively allowing the fluids to flow through the reactor.

21. The apparatus of claim 20, wherein the means for configuring the one or more valves includes means for separately causing the carrier fluid and the at least one reactant fluid to flow through the reactor.

22. The apparatus of claim 19, and further including:
means for removing the magnetic field to de-couple at least some of the magnetically coupled catalytic particles from the HPMM; and
means for causing a flushing fluid to flow through the HPMM for clearing the de-coupled catalytic particles out of the reactor body.

23. The apparatus of claim 22, wherein:
the means for initializing the magnetic field includes means for moving at least one permanent magnet and the reactor body closer to each other; and
the means for removing the magnetic field includes means for moving the at least one permanent magnet and the reactor body away from each other.

24. The apparatus of claim 22, wherein:
the means for initializing the magnetic field includes means for energizing an electromagnet that is configured with at least a portion of the reactor body; and
the means for removing the magnetic field includes means for de-energizing the electromagnet.

25. The apparatus of claim 19, wherein the means for causing the carrier fluid to flow through the HPMM includes means for allowing the catalytic particles to become approximately homogeneously distributed throughout the HPMM before initializing the magnetic field.

26. The apparatus of claim 19, wherein the catalytic particles include ferromagnetic, diamagnetic or paramagnetic catalytic particles.

27. The apparatus of claim 19, wherein the catalytic particles are sized between approximately 10 nanometers and approximately 3 millimeters.

* * * * *